United States Patent [19]

Tatsuki et al.

[11] Patent Number: 4,849,384

[45] Date of Patent: Jul. 18, 1989

[54] DIELECTRIC PORCELAIN

[75] Inventors: Kouichi Tatsuki, Kanagawa; Kanji Murano, Tokyo; Susumu Nishigaki, Aichi, all of Japan

[73] Assignees: Sony Corporation; Narumi China Corporation, both of Japan

[21] Appl. No.: 212,168

[22] Filed: Jun. 13, 1988

Related U.S. Application Data

[63] Continuation of Ser. No. 889,834, Jul. 28, 1986, abandoned.

[30] Foreign Application Priority Data

Jul. 29, 1985 [JP] Japan ................................ 60-165921

[51] Int. Cl.[4] ........................ C04B 35/48; C04B 35/50

[52] U.S. Cl. ..................................... 501/134; 501/152

[58] Field of Search ................................ 501/134, 152

[56] References Cited

U.S. PATENT DOCUMENTS

| | | | |
|---|---|---|---|
| 2,739,900 | 3/1956 | Day | 501/134 |
| 2,915,407 | 12/1959 | Gulton | 501/134 |

*Primary Examiner*—Mark L. Bell

[57] ABSTRACT

There is provided a dielectric porcelain used as dielectric resonator mainly in a microwave range. According to the present invention, 0.1 to 5.3 mol % of one or more of $Tb_4O_7$, $CeO_2$, $TeO_2$, $Gd_2O_3$ and $Dy_2O_3$ as additive is admixed to a dielectric material $Pb_xZr_{(1-x)}O_{(2-x)}$ wherein $0.42 \leqq \leqq 0.69$ to procure a dielectric constant while keeping the dielectric loss to a lower value and simultaneously controlling temperature characteristics of the dielectric constant, that is, temperature characteristics of the resonant frequency.

4 Claims, No Drawings

DIELECTRIC PORCELAIN

This is a continuation, of application Ser. No. 889,834, filed July 28, 1986

BACKGROUND OF THE INVENTION

1. Field of the Invention

This invention relates to a dielectric procelain used as a dielectric resonator mainly in the microwave range and, more particularly, to an improvement in the composition thereof.

2. Description of the Prior Art

Dielectric porcelain is used in the microwave range as, for example, the dielectric resonator for a microwave circuit, as an element for impedance matching, and as the substrate for a microwave integrated circuit (microwave IC). Above, all the dielectric resonator used as a filter or for frequency stabilization of the oscillator contributes to miniturization of the microwave circuit. The operating principle of the dielectric rsonator is that the wavelength of an electro-magnetic wave when passing through a dielectric material is reduced to $1/\sqrt{E}$ where $\epsilon$ denotes the dielectric constant. Hence, a larger dielectric constant is more favorable for miniturization.

In the meantime, with the expansion in the range of the working frequency range of the dielectric resonator, a need exists for a miniturized dielectric resonator used in the microwave range with a longer wavelength. For example, an effort is made for evolving a dielectric oscillator with the aim of stabilizing the frequency of the local oscillator within a receiver for satellite broadcasting. Thus, dielectric materials have good microwave characteristics, such as $(Zr{\cdot}Sn)TiO_4$ or $[Zn_{1/3}(Nb\cdot Ta)_{\frac{2}{3}}]O_3$, have evolved. However, these materials have a dielectric constant as low as 30 to 40 such that, although the resonator formed of these materials and designed to oscillate at a frequency in the vicinity of 10GHz may be 5 to 6 mm in thickness and 2 to 3 mm in height, the resonator designed to oscillate at a lower frequency such as 3GHz becomes too large with the diameter thereof exceeding 20 mm.

Hence, an effort is made for evolving a dielectric material with a higher dielectric constant, such as $BaO$-$Nd_2O_3$-$TiO_2$-$PbO$ dielectric material having a dielectric constant of 80 to 90. However, with such a range of the dielectric constant, it is not possible to sufficiently reduce the size of the resonator. For example, the resonator designed to oscillate at 3GHz will have a diameter of approximately 12 to 13 mm. Although $SrTiO_3$-$CaTiO_3$-$CaSiTiO_3$ dielectric material with a dielectric constant as high as 100 to 230 has been evolved, this material is not suitable as the dielectric resonator material since it exhibits temperature characteristics of the dielectric constant of $-450$ to $-1500$ ppm/°C. and thus larger in the negative side and hence temperature characteristics of the resonance frequency that are larger in the positive side, while also experiencing larger dielectric loss.

In view of the foregoing, a need exists for evoling a dielectric material having a higher dielectric constant in the lower microvwave range and being subject to lesser dielectic loss and lower changes in the dielectric constant with temperature.

SUMMARY OF THE INVENTION

The major reason why the dielectric resonator material having the higher dielectric constant as described above is not obtained is that the material having a higher dielectric constant and yet experiencing a lower dielectric loss without exception has negative temperature characteristics of the dielectric constant, that is, positive temperature characteristics of the resonance frequency. Hence it is conceived that a dielectric material having positive temperature characterisitcs in its dielectric constant, if found, can be combined with the conventional dielectric material so as to produce a dielectric resonator having extremely small temperature changes in its dielectric constant.

It is therefore an object of the present invention to provide a dielectric porcelain formed of a dielectric material having a high dielectric constant, a low dielectric loss and positive temperature characteristics of the dielectric constant or negative temperature characteristics of the resonance frequency.

According to the present invention, 0.1 to 5.3 mol% of an additive selected from the group consisting of one or more of $Tb_4O_7$, $CeO_2$, $TeO_2$, $Gd_2O_3$ and $Dy_2O_3$ is admixed with a dielectric material $Pb_xZr_{(l-x)}O_{(2-x)}$ wherein $0.42 \leqq X \leqq 0.69$ to secure a, suitable dielectric constant while keeping dielectric loss to a lower value and simultaneously controlling temperature characteristics of the dielectric constant or temperature characteristics of the resonant frequency.

Accoridng to the present invention, lead oxide and zirconium oxide are blended with at least one of terbium oxide, cerium oxide, dysprosium oxide, a gadolinium oxide and tellurium oxide at a predetermined relative percentage and the resulting blended product is calcined to produce a dielecttric porcelain having a high dielectric constant and a positive temperature coefficient of the dielectric constant or a negative temperature coefficient of the resonant frequency.

DETAILED DESCRIPTION OF THE INVENTION

As a result of our eager resarches into evolving a dielectric porcelain capable of satisfying the aforementioned requirements for dielectric characteristics, the present inventors have found that such a need can be fulfilled by a dielectric porcelain obtained by a solid phase reaction of a mixture at a predetermined mixture ratio of lead oxide and zirconium oxide with one or more of a group consisting of terbium oxide, cerium oxide, dysprosium oxide, gadolinium oxide and tellurium oxide.

On the basis of this finding, the dielectric porcelain of the present invention is characterized in that it is mainly composed of $Pb_xZr_{(1-x)}O_{(2-X)}$ where $0.42 \leqq X \leqq 0.69$, with addition thereto of 0.1 to 5.3 mol % of at least one of $Tb_4O_7$, $CeO_2$, $TeO_2$, $Gd_2O_3$ and $Dy_2O_3$. By the combination thereof with the dielectric porcelain composed of the material having negative temperature characteristics of its dielectric constant, there are provided a dielectric resonater having a high dielectric constant and extremely small temperature sensitivity of the dielectric constant and an oscillator or a filter which is small in size and excellent in stability even in the microwave range of 2 to 4 GHz.

Our experiments have revealed that, with the radio of lead $X$ less than 0.42, cracks are produced in the resulting sintered product so that it become impossible to measure the dielectric constant or other parameters, and that, with the ratio $X$ higher than 0.69, an increased amount of lead oxde is vaporized off with the result that it is not possible to obtain good sintered products. With the zirconium ratio lower than 0.31, there may result poor sintering and, with the ratio higher than 0.58, crasks are developed in the resulting sintered product so that it becomes a impossible to measure the dielectric constant and other parameters.

With the mole percentage y of the additives, such as terbum oxide, cerium oxide, dysprosium oxide, gadolium oxide or tellurium oxide less than 0.1 mol % sintering properties are lowered resulting in the reduced value of the no-load Q and increased dielectric loss. With the mole percentage higher than 5.3 mol %, the dielectric constant becomes too small.

The dielectric porcelain of the present invention can be prepared by mixing predetermined amount of a starting powdered material comprised of PbO, ZrO and one or more of $Tb_4O_7$, $CeO_2$, $TeO_2$, $Gd_2O_3$ and $Dy_2O_3$ so as to satisfy the aforementioned mole percentage and by sintering the resulting mixture. However, according to a more convenient method, the starting powders are provisionally calcined in advance at a slightly lower temperature, the resulting product is crushed and again mixed together, the resulting mixture being then molded under pressure and sintered utimately. For fear that PbO is vaporized off, such sintering is preferably carried out by hot press sintering for 4 to 10 hours under a pressure of 100 to 250 kg/cm$^2$ and at a temperature of 1200° to 1300° C., or by sintering under a PbO atmosphere for 4 to 10 hours at a temperature of 1200° to 1300°C. When PbO is vaporized off, the composition of the resulting dielectric porcelain is changed so that it becomes difficult to procure the desired dielectric characteristics.

It is seen from the foregoing that the dielectric porcelain according to the present invention is a sintered body composed of predetermined amounts of lead oxide, zirconium oxide and at least one of terbium oxide, cerium oxide, dysprosium oxide, gadolinium oxide and tellurium oxide as additive, such that both the dielectric constant and the no-load Q are improved, while simultaneously there are provided positive (plus) temperature characteristics of the dielectric constant or negative (minus) temperature characteristics of the resonant frequency. In this manner, temperature charcteristics of the dielectric contant can be freely adjusted by using the dielectric porcelain of the present invention in combination with the prior-art dielectric invention in combination with the prior-art dielectric porcelain having the negative or minus temperature characteristics of the dielectric constant, in other words, the positive or plus temperature characteristics of the resonant frequency.

The present invention will be explained further bvy referring to several specific examples. However, these examples are given only by way of illustration and are not intended to limit the scope of the present invention.

Example 1

As starting materials, commercially available PbO, $ZrO_2$ and $Tb_4O_7$ were used and weighed out so as to give the composition shown in Table 1. These ingredients were charged into a ball mill together with pure water and the resulting mass was wet mixed for 16 hours. It is noted that the molar fraction of $Tb_4O_7$ was calculated as $TbO_{7/4}$.

The resulting composition was filtered, dried and molded into a disk which was then preliminarily calcined in air at 850°C. for one hour.

The calcined product was charged and crushed in a mortar, and charged into a ball mill together with pure water for performing a wet comminution for 16 hours. The resulting ball-milled product was filtered, dried, graded with a minor amount of pure water, and molded into a disk 20 mm in diameter and 10 mm in thickness by using a hydraulic press operating at a pressure of 1000 kg/cm$^2$.

The resulting molded product was hot-press-sintered for 4 to 10 hours at 1200 to 1250°C. at a pressure of 100 to 250 kg/cm$^2$ to form dielectric porcelain samples (samples 1 to 13 and Comparative Examples 1 to 6).

The resulting samples were worked into a form having a resonant frequency of approximately 3HGz. The resonance characteristics of the respective samples, namely the dielectric constant $\epsilon$, no-load W and temperature characteristics $\tau_f$ of the resonance frequency at the range of temperature from −20° to +60°C. , were measured in a wave guide. The results are shown in Table 1. In this Table, the measured value of the no-load Q for the Comparative Example 3 was so poor that the dielectric constant and the temperature characteristics of the resonant frequency had to be measured for 1 MHz.

TABLE 1

| | composition (mol %) | | | dielectric characteristics (for 3GHz) | | |
|---|---|---|---|---|---|---|
| | PbO | $ZrO_2$ | $TbO_{7/4}$ | dielectric constant $\epsilon$ | no-load Q | $\tau_f$ (ppm/°C.) |
| Comparative Example 1 | 73.7 | 26.3 | 5.3 | * | * | * |
| Sample 1 | 68.4 | 31.6 | 5.3 | 101 | 280 | −820 |
| Sample 2 | 63.2 | 36.8 | 5.3 | 111 | 280 | −950 |
| Sample 3 | 60.6 | 39.4 | 1.0 | 139 | 630 | −1140 |
| Sample 4 | 57.9 | 42.1 | 5.3 | 115 | 290 | −960 |
| Comparative Example 2 | 56.8 | 43.2 | 10.9 | 81 | 240 | −830 |
| Sample 5 | 52.0 | 48.0 | 1.0 | 138 | 610 | −1090 |
| Sample 6 | 51.7 | 48.3 | 0.5 | 139 | 590 | −1050 |
| Sample 7 | 51.6 | 48.4 | 0.3 | 140 | 630 | −1040 |
| Comparative Example 3 | 51.5 | 48.5 | 0.0 | 147 | $<10$ | −1000 |
| Sample 8 | 51.5 | 58.5 | 1.4 | 124 | 570 | −980 |
| Sample 9 | 51.3 | 48.7 | 0.1 | 136 | 480 | −1000 |
| Sample 10 | 51.3 | 48.7 | 2.6 | 132 | 360 | −980 |
| Sample 11 | 51.3 | 48.7 | 5.3 | 118 | 290 | −880 |
| Comparative Example 4 | 51.2 | 48.8 | 11.1 | 88 | 230 | −870 |
| Comparative Example 5 | 51.2 | 48.8 | 17.6 | 50 | 160 | −670 |
| Sample 12 | 47.4 | 52.6 | 5.3 | 120 | 300 | −980 |
| Sample 13 | 42.1 | 57.9 | 5.3 | 113 | 270 | −990 |
| Comparative Example 6 | 36.8 | 63.2 | 5.3 | 101 | 200 | −880 |

(* measurement not feasible because of bad sintering)

Example 2

As starting materials, commercially available PbO, $ZrO_2$ and $CeO_2$ were used. These ingredients were weighed out so as to give the relative composition shown in Table 2. By using the method described in Example 1, dielectric porcelain samples (samples 14 to 19 and Comparative Examples 7 and 8) were produced.

The resulting dielectric porcelain samples were worked into a form having a resonance frequency of approximately 3 GHz and the resonance characteristics of the respective samples, namely the dielectric constant ε, no-load Q and temperature characteristics $\epsilon_f$ of the resonant frequency for the temperature range of −20° to +60°C. were measured within a waveguide. The results are shown in Table 2.

TABLE 2

| | composition (mol %) | | | dielectric characteristics (for 3GHz) | | |
|---|---|---|---|---|---|---|
| | | | | dielectric constant | no-load | $\tau_f$ (ppm/ |
| | PbO | $ZrO_2$ | $CeO_2$ | ε | Q | °C.) |
| Sample 14 | 63.9 | 36.1 | 5.2 | 130 | 340 | −1080 |
| Sample 15 | 54.8 | 45.2 | 0.5 | 142 | 590 | −1080 |
| Sample 16 | 51.7 | 48.3 | 0.5 | 140 | 710 | −1060 |
| Sample 17 | 49.0 | 51.0 | 2.6 | 135 | 460 | −1000 |
| Sample 18 | 48.9 | 51.1 | 0.5 | 140 | 540 | −1050 |
| Sample 19 | 43.5 | 56.5 | 5.2 | 110 | 310 | −930 |
| Comparative Example 7 | 74.1 | 25.9 | 5.2 | * | * | * |
| Comparative Example 8 | 34.2 | 65.8 | 5.2 | * | * | * |

*measurement not feasible because of bad sintering)

Example 3

As starting materials, commercially available PbO, $ZrO_2$ and $TeO_2$ were used. Theses ingredients were weighed out so as to give the relative composition shown in Table 3. Then, by using the method same as that of the preceding Example 1, dielectric porcelain samples (samples 20 to 25 and Comparative Example 9) were produced.

The resulting dielectric porcelain samples were worked into a form having the resonant frequency of approximately 3 GHz and the resonance characteristics of the respective samples, namely the dielectric constant ε, no-load Q and temperature characteristics at the resonant frequency for the temperature of −20° to +60°C., were measured within a waveguide. The results are shown in the following Table 3.

TABLE 3

| | composition (mol %) | | | dielectric characteristics (for 3GHz) | | |
|---|---|---|---|---|---|---|
| | | | | dielectric constant | no-load | $\tau_f$ (ppm/ |
| | PbO | $ZrO_2$ | $TeO_2$ | ε | Q | °C.) |
| Sample 20 | 63.2 | 36.8 | 5.3 | 131 | 430 | −890 |
| Sample 21 | 60.6 | 39.4 | 1.0 | 130 | 610 | −960 |
| Sample 22 | 55.6 | 44.4 | 1.0 | 131 | 620 | −940 |
| Sample 23 | 52.0 | 48.0 | 1.0 | 131 | 470 | −1050 |
| Sample 24 | 51.7 | 48.3 | 0.5 | 138 | 550 | −1040 |
| Sample 25 | 51.3 | 48.7 | 5.3 | 129 | 350 | −1030 |
| Comparative Example 9 | 51.2 | 48.8 | 11.1 | 97 | 120 | −820 |

Example 4

As starting materials, commercially available PbO, $ZrO_2$ and $Gd_2O_3$ were used. These ingredients were weighed so as to give the relative composition shown in Table 4. Then, by using the method same as that of the preceding Example 1, dielectric porcelain samples (samples 26 to 28 and the Comparative Example 10) were produced. The molar fraction of the ingredient $Gd_2O_3$ was calculated as $GdO_{3/2}$.

The resulting dielectric porcelain samples were worked into a form that will have a resonant frequency of approximately 3 GHz and the resonant characteristics thereof, namely the dielectric constant ε, no-load Q and the temperature characteristics of the resonant frequency for the temperature range of from −20° to +60°C., were measured within a waveguide. The results are shown in the following Table 4.

TABLE 4

| | composition (mol %) | | | dielectric characteristics (for 3GHz) | | |
|---|---|---|---|---|---|---|
| | | | | dielectric constant | no-load | $\tau_f$ (ppm/ |
| | PbO | $ZrO_2$ | $GdO_{3/2}$ | ε | Q | °C.) |
| Sample 26 | 51.7 | 48.3 | 0.5 | 142 | 460 | −880 |
| Sample 27 | 51.2 | 48.8 | 0.2 | 141 | 700 | −1030 |
| Sample 28 | 42.1 | 57.9 | 5.3 | 113 | 260 | −970 |
| Comparative Example 10 | 51.2 | 48.8 | 11.1 | 90 | 150 | −920 |

Example 5

As starting materials, commercially available PbO, $ZrO_2$ and $Dy_2O_3$ were used. These ingredients were weighed so as to give the relative composition shown in Table 5. Then, by using the method same as that of the preceding Example 1, dielectric porcelain samples (sample 29 to 31 and the Comparative Example 11) were produced. It is noted that the molar fraction of the ingredient $Dy_2O_3$ was calculated as $DyO_{3/2}$.

The resulting dielectric procelain samples were worked into a form that will have a resonant frequency of approximately 3 GHz and the resonant characteristics thereof, namely the dielectric constant ε, no-load Q and temperature characteristics $\tau_f$ of the resonant frequency for the temperature range of from −20° to +60°C., were measured within a waveguide. The results are shown in the following Table 5.

TABLE 5

| | composition (mol %) | | | dielectric characteristics (for 3GHz) | | |
|---|---|---|---|---|---|---|
| | | | | dielectric constant | no-load | $\tau_f$ (ppm/ |
| | PbO | $ZrO_2$ | $DyO_{3/2}$ | ε | Q | °C.) |
| Sample 26 | 63.2 | 36.8 | 5.3 | 107 | 260 | −330 |
| Sample 27 | 51.2 | 48.8 | 2.6 | 134 | 310 | −970 |
| Sample 28 | 51.3 | 48.7 | 5.3 | 115 | 260 | −850 |
| Comparative Example 10 | 51.2 | 48.8 | 11.1 | 85 | 200 | −720 |

Example 6

As starting materials, commercially available PbO, $ZrO_2$ and two or more of $CeO_2$, $Tb_4O_7$ and $Gd_2O_3$ as additives were used. These ingredients were weighed so as to give the relative composition shown in Table 6. Then, by using the method same as that used in the preceding Example 1, dielectric porcelain samples (samples 29 to 32) were produced.

The resulting respective dielectric porcelain samples were worked into a form that will have the resonant frequency of approximately 3 GHz and the resonant characteristics thereof, namely the dielectric constant ε, no-load Q and temperature characteristics of the resonant frequency for the temperature range of from −20° to +60°C., were measured within a waveguide. The results are shown in the following Table 6.

TABLE 6

| | composition (mol %) | | additives | | dielectric characteristics (for 3GHz) | | |
|---|---|---|---|---|---|---|---|
| | PbO | $ZrO_2$ | kind | composition | dielectric constant ε | no-load Q | $\tau_f$ (ppm/°C.) |
| Sample 29 | 52.2 | 47.8 | $CeO_2$ $TbO_{7/4}$ | 1.5 | 136 | 440 | −1040 |
| Sample 30 | 51.7 | 48.3 | $CeO_2$ $TbO_{7/4}$ | 0.5 | 139 | 650 | −1140 |
| Sample 31 | 52.2 | 47.8 | $GdO_{3/2}$ $TbO_{4/7}$ | 1.5 | 135 | 300 | −1010 |
| Sample 32 | 52.2 | 47.8 | $GdP_{3/2}$ $GeO_2$ $TbO_{7/4}$ | 1.5 | 136 | 340 | −1030 |

It is seen from these Tables that the samples of the present invention have the higher values of the dielectric constant and the no-load Q while also presenting negative or minus temperature characteristics of the resonant frequency or positive or plus temperatures characteristics of the dielectric constant.

The respective samples of the Comparative Examples that are not comprised within the scope of the present invention are not desirable because of the poor sintering, the lower value of the no-load Q and the larger value of the dielectric constant.

What is claimed is:

1. A dielectric porcelain consisting essentially of the carrier $Pb_xZr_{(1-x)}O_{(2-x)}$ *wherein x is in the range of* 0.42 to 0.69, having added thereto $Tb_4O_7$ in an amount of from 0.1 to 5.3 mol percent calculated as $TbO_{7/4}$.

2. A dielectric porcelain consisting essentially of the carrier $Pb_xZr_{(1-x)}O_{(2-x)}$ wherein x is in the range of 0.42 to 0.69, having added thereto $TeO_2$ in an amount of from 0.1 to 5.3 mol percent.

3. A dielectric porcelain consisting essentially of hte carrier $Pb_xZr_{(1-x)}O_{(2-x)}$ wherein x is in the range of 0.42 to 0.69, having added thereto $Gd_2O_3$ in an amount of from 0.1 to 5.3 mol percent calculated as $GdO_{3/2}$.

4. A dielectric porcelain consisting essentially of the carrier $Pb_xZr_{(1-x)}O_{(2-x)}$ wherein x is in the range of 0.42 to 0.69, having added thereto $Dy_2O_3$ in an amount of from 0.1 to 5.3 mol percent calculated as $DyO_{3/2}$.

* * * * *